(12) United States Patent
Pande

(10) Patent No.: US 8,938,218 B2
(45) Date of Patent: Jan. 20, 2015

(54) MOBILE BASED ADVISORY SYSTEM AND A METHOD THEREOF

(75) Inventor: Arun Pande, Thane (IN)

(73) Assignee: Tata Consultancy Services Ltd. (IN)

( * ) Notice: Subject to any disclaimer, the term of this patent is extended or adjusted under 35 U.S.C. 154(b) by 714 days.

(21) Appl. No.: 12/663,416

(22) PCT Filed: Jun. 4, 2008

(86) PCT No.: PCT/IN2008/000353

§ 371 (c)(1),
(2), (4) Date: Dec. 7, 2009

(87) PCT Pub. No.: WO2009/050729

PCT Pub. Date: Apr. 23, 2009

(65) Prior Publication Data

US 2010/0109946 A1 May 6, 2010

(30) Foreign Application Priority Data

Jun. 6, 2007 (IN) .......................... 1078/MUM/2007

(51) Int. Cl.
*H04M 3/42* (2006.01)
*G06N 5/04* (2006.01)
(Continued)

(52) U.S. Cl.
CPC ................ *G06N 5/04* (2013.01); *A01B 79/005* (2013.01); *G06F 17/30241* (2013.01); *G06Q 30/02* (2013.01); *G06Q 50/02* (2013.01); *H04L 67/12* (2013.01)
USPC ........ 455/414.1; 455/406; 455/466; 707/759; 715/810

(58) Field of Classification Search
CPC ....... G06Q 10/10; G06Q 30/02; G06Q 10/06; H04M 2201/40; H04M 3/493; H04M 1/72519; H04M 2250/70; Y10S 128/094; H04L 41/0677; A01H 5/10; A01H 1/02; A01H 5/00; A01H 1/04; A01H 5/08; C12Q 1/69; C12Q 1/6895; C12Q 2600/13; A23K 1/146; C12N 15/8282; C12N 15/8273; C12N 1/12; C12N 1/38; G01N 2033/245; G01N 21/88; G01N 33/0098; C05F 7/00; C05F 11/00; C05F 9/04
USPC ......... 707/759; 455/414.1, 406, 466; 715/810
See application file for complete search history.

(56) References Cited

U.S. PATENT DOCUMENTS 6,014,451 A * 1/2000 Berry et al. .................... 382/110
6,141,614 A 10/2000 Janzen et al.
(Continued)

FOREIGN PATENT DOCUMENTS

EP     1 560 114 A1    8/2005
GB     2407230 A    4/2005
(Continued)

OTHER PUBLICATIONS

Shao, L. et al. "Research on Ontology Knowledge Retrieval to the Expert Consultation of Greenhouse" In: IEEE International Conference on Communication Technology, ICCT '06, 2006, New York: IEEE, Nov. 27, 2006, pp. 1-4, XP031071955, ISBN 1-4244-0800-8 sections I-VI.

(Continued)

*Primary Examiner* — Nimesh Patel
(74) *Attorney, Agent, or Firm* — Robert Plotkin, P.C.

(57) ABSTRACT

A system and method for mobile based advising is provided. The system and method involve the user with his mobile terminal formulating a query based on his own input and external sensor input and then sending the query to a remote server, which sends it to an expert group who devise an expert advice, which is then sent back to the user.

12 Claims, 2 Drawing Sheets

Figure 1:
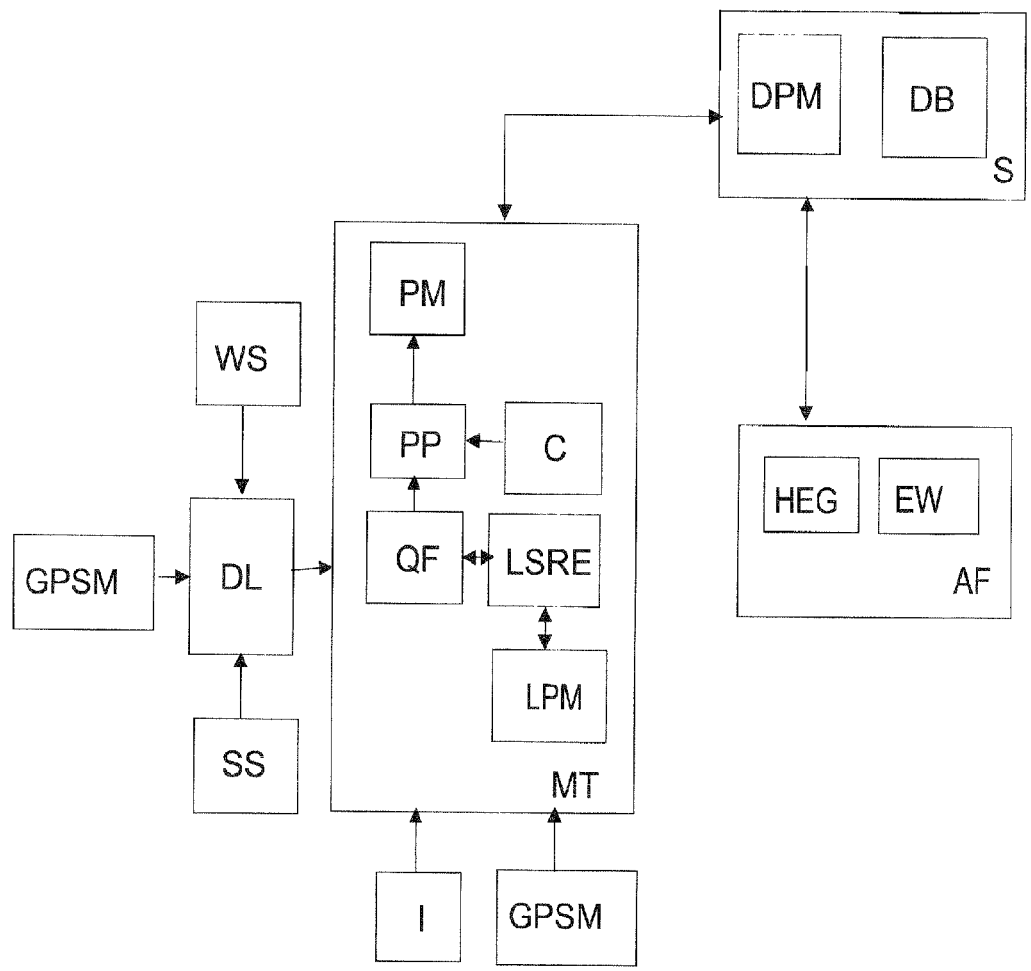

(51) Int. Cl.
*A01B 79/00* (2006.01)
*G06F 17/30* (2006.01)
*G06Q 30/02* (2012.01)
*G06Q 50/02* (2012.01)
*H04L 29/08* (2006.01)

(56) References Cited

U.S. PATENT DOCUMENTS

| | | | |
|---|---|---|---|
| 6,553,299 | B1 | 4/2003 | Keller et al. |
| 6,590,529 | B2 | 7/2003 | Schwoegler |
| 6,990,459 | B2 | 1/2006 | Schneider |
| 7,047,133 | B1* | 5/2006 | Dyer et al. .................. 702/5 |
| 7,112,806 | B2* | 9/2006 | Lussier .................. 250/458.1 |
| 7,171,912 | B2 | 2/2007 | Fraisse et al. |
| 7,184,859 | B2* | 2/2007 | Hood et al. .................. 700/284 |
| 7,209,922 | B2 | 4/2007 | Maze et al. |
| 7,212,922 | B1 | 5/2007 | Longacre et al. |
| 2003/0119551 | A1* | 6/2003 | Laukkanen et al. .......... 455/556 |
| 2003/0172133 | A1* | 9/2003 | Smith et al. .................. 709/219 |
| 2003/0187641 | A1* | 10/2003 | Moore et al. .................. 704/235 |
| 2004/0243993 | A1* | 12/2004 | Okonnen et al. .............. 717/168 |
| 2005/0137803 | A1* | 6/2005 | Kleemola et al. .................. 702/2 |
| 2006/0015335 | A1* | 1/2006 | Vennelakanti et al. ....... 704/235 |

FOREIGN PATENT DOCUMENTS

| | | |
|---|---|---|
| JP | 2001160193 A | 6/2001 |
| JP | 2007-124932 A | 5/2007 |
| WO | WO 99/21118 A1 | 4/1999 |
| WO | WO 01/16859 A2 | 3/2001 |
| WO | WO 2005/091189 A1 | 9/2005 |

OTHER PUBLICATIONS

Ramamritham, K. et al. "Innovative ICT Tools for Information Provision in Agricultural Extension (Dec. 2005)" In: IEEE International Conference on information and Communication Technologies and Development, ICTD '06, 2006, New York: IEEE, May 25, 2006, pp. 34-38, XP031042051, ISBN 1-4244-0485-1. sections I-IV.

Karkowski, M. et al. "Modern Data Acquisition System in the Road Weather Stations Monitoring" In: Proceedings of the Second IEEE International Workshop on Intelligent Data Acquisition and Advanced Computing Systems: Technology and Applications, 2003, New York: IEEE, Sep. 8, 2003, pp. 442-446, XP010671843, ISBN 0-7803-8138-6 sections I , 2, 4, 5.

Zue, V.W. Navigating the Information Superhighway Using Spoken Language Interfaces. IEEE Expert. Oct. 1995 (Oct. 2005), vol. 10, No. 5, pp. 39-43, XP000539893,ISSN 0885-9000.

International Search Report mailed May 6, 2009 in related International Application PCT/IN2008/000353 (3 pages).

\* cited by examiner

MOBILE BASED ADVISORY SYSTEM AND A METHOD THEREOF

CROSS-REFERENCE TO RELATED APPLICATIONS

This is a National Phase application of PCT International Application No, PCT/IN2008/000353 filed Jun. 4, 2008, which claims priority from Indian Patent Application 1078/MUM/2007 filed Jun. 6, 2007, the entire content of each of which is incorporated herein by reference.

FIELD OF THE INVENTION

The invention relates to the field of telecommunications.
Particularly, this invention relates to a mobile based advising system and a method constituted therein.

BACKGROUND OF THE INVENTION AND EXISTING KNOWLEDGE

Meteorological institutes give the weather conditions prevailing in a region. This information issued cannot be very reliable as there may be sudden changes in the weather. These sudden changes in the weather may cause serious damage to life and property. It is very essential to have prior information of such weather changes especially during trekking, biking or skiing so as to prevent danger. This information is also useful for planning various agricultural operations, particularly rainfed farming.

Conventionally farmers get advice or information through articles in the newspapers, TV and radio programs or direct interaction with the experts. But the queries of farmers are not solved by the general information passed through the media. The ratio of experts to farmers is typically very much skewed and hence, only a small fraction of the total number of farmer population is benefited through direct interaction mode.

U.S. Pat. No. 6,553,299 describes integration of Real Time Kinematics (RTK) global positioning system (GPS) technology with precision farming methodologies to provide highly accurate seeding, cultivating, planting and/or harvesting operations. However, the system does not extend to forming a human or machine generated expert advice to a specific query instantly available to a farmer.

U.S. Pat. No. 6,590,529 describes an individualized, location specific weather forecasting system in which the location of an electronic device is detected; and weather data is generated and transmitted to the electronic device so that subscribers receive weather forecast data specific to their current location.

U.S. Pat. No. 7,212,922 describes a method of using climate data to determine activity index values for a given activity. The method indicates that the activity index values, which may be used to answer specific queries relating thereto. However, the method does not extend to use of various sensors such as soil, weather, camera phone to get time and location specific information and use it to answer queries generated on a mobile terminal and provide a personalized expert advice on the same device through a remote server in his language.

U.S. Pat. No. 7,209,922 describes a system and method used for organization of information and retrieval of information adapted for use in a computer system.

U.S. Pat. No. 7,184,859 describes the use of remotely sensed spectral image data to develop a Vegetation Index file which represents spatial variations of actual crop vigor throughout a field that is under cultivation. A query can be formulated, which is forwarded via email or FTP to a central processing site. A reply is returned via email or FTP to onside farm personnel.

U.S. Pat. No. 7,171,912 A map of site-specific amounts of a soil nutrient, to be applied in fertilizer to an agricultural field is created using a map of site-specific amounts of the soil nutrient needed to produce maximum possible yield at the particular site.

U.S. Pat. No. 7,047,133 describes a method and system of evaluating crop performance facilitates characterization of the environmental impact of a geographic region or areas within the region for growing plant-life. Environmental measurements are obtained. The method and the system described in this document does not extend to expert or machine generating expert advice remotely based on the sensor data obtained through wireless network and transferring this expert advice to a mobile terminal in response to a farm personnel's query from a mobile terminal in his language.

U.S. Pat. No. 6,990,459 describes a system comprised of hardware, software and business processes for developing an optimal custom farm management plan, and in particular, a single year or multi-year crop selection, acreage allocation, and resource management strategies for production agriculture by using mathematical programming and sensitivity analysis to help the user determine optimal allocations of controllable resources such as land, capital, labor, water, machinery, and chemicals in the context of farm management objectives.

U.S. Pat. No. 6,141,614 describes a computer-aided farming system having a first control system which receives data defining a plurality of parameters and determines a plurality of nodes located at an agricultural field, and determines a condition status associated with each node. The system also has a second control system located on an agricultural machine, which receives data defining the nodes and the condition status at each node and plans a path as a function of the nodes, and determines a desired work operation relative to each node.

United Kingdoms patent 2407230 describes a mobile device such as a personal digital assistant (PDA) or mobile phone to obtain its geographic location, using for example a global positioning system (GPS), and provides the location to a sever, preferably through a wireless connection.

Japanese patent 2001160193 describes a system to report information corresponding to an inquiry from a mountain climber by reporting the rapid change of weather or the like corresponding to registered contents for every mountain climber, avoiding the danger thereof.

None of the above systems mentioned methods and systems extend to obtaining time specific, location specific, crop specific data through sensors and passing it to a remote store for generating expert advice by human or machine for the farm personnel in local language, in response to a query generated through a mobile terminal by farm personnel.

OBJECTS OF INVENTION

The object of this invention is to provide personalized expert advice by means of a mobile terminal in the local language.

One more object of this invention is to enable a user to generate a query from a mobile terminal in local language.

Yet another object of this invention is to provide- time specific, location specific information regarding parameters like weather, traffic density and the like to a user using sensors.

Another object of this invention is to make query generation simple so that even illiterate people can generate a query and receive a reply or advice by using the mobile terminal.

Yet another object of this invention is to enable the expert advice to reach large number of users.

Still one more object of this invention is to prevent or minimize damage caused due to sudden weather changes.

Still one more object of this invention is to help a user in performing certain operations by supplying necessary information.

Another object of this invention is to provide an advisory system, which is easy to use and reliable.

Still one more object of this invention is to provide a mobile advisory system, which is affordable.

SUMMARY OF THE INVENTION

In accordance with this invention a mobile based advisory system is provided, said system comprising,
- a user end comprising transmitting and receiving means to transmit a formulated query and to receive advice; said user end provided with input means (I) and output means;
- a data logger means (DL) for storing various parameter values obtained from various sensors to form collected data;
- a query formulation means, to generate queries according to the collected data;
- a remote server means comprising transmitting and receiving means receive queries and to transmit formulated advice over wireless network/internet;
- the remote server means (S) provided with a query receiving means adapted to receive generated queries;
- a human expert group/expert workstation (HEG/EW) provided with an advice formulation means; and
- transmitting means at said server end (S), adapted to send advice formulated to said user end.

Typically, the mobile terminal (MT) is configured to download specific application script (AS)/Indian language script rendering engine (LSRE) in text and voice menu.

Typically, said query formulation means (QF) is provided for generating a query from the input means (I) at the user end.

Typically, a language processing means (LPM) is provided for converting formulated advice in text form to voice and recognize the voice commands in a selected local language.

Typically, external sensors are provided at the user end S for collecting external environmental information and the mobile terminal at user end is further configured to a data logger (DL) for collection and processing data from the external sensors.

Typically, the data logger is provided with means for obtaining location of the user at any given time using GPS modem (GPSM).

Typically, the mobile terminal is provided with a camera for capturing images typically of soil or crops and further comprises an application script means processing camera phone images, sensor data, and voice and text menu.

Typically, the mobile terminal/user comprises a pre-processing means (PP) for rearranging sensor data and query data before transmission to the remote server.

Typically, the, mobile terminal/user comprises a personalization means (PM) for stamping the query and sensor data with time/date/location and other identification parameters of the user.

Typically, the server (S) comprises application script means for processing input query and transmission means for routing the results to appropriate remotely located expert workstations.

Typically, the server (S) comprises a database (DB) which further comprises a profile of all the users.

Typically, the server (S) receives the query along with the transmitted data and retrieves the relevant data from its database/Internet.

Typically, the advice formulation means is located at the expert workstation provides relevant, personalized advice and information to server (S) end.

Typically, the server (S) comprises a data tagging, arranging and processing means (DPM) for linking data with the user's query.

Typically, the Mobile terminal/user comprises display means to display the results in text/voice form in the local language of the user.

Typically, the mobile terminal advisory system is adapted to send alerts to the user on his mobile terminal in case of any future updates.

Typically, the system is used to provide advice and information regarding agricultural activities/to obtain information and advice regarding weather conditions and for obtaining information about the traffic conditions on the roads/market rates of different commodities and the like.

In accordance with this invention, there is provided a mobile based advisory method comprising the following steps
- launching an application at a user end;
- collecting environmental/external parameters with the help of a data logger and from a plurality of sensors;
- formulating a query based on sensor data and query data;
- sending query to an external server;
- processing query at the server end based on data from a database;
- sending data and query to expert group for analysis and formulating an advice; and
- sending back received advice to the user end.

All the above steps are done through mobile terminal and in local language.

Typically, a region specific application is downloaded by a user on his mobile terminal.

Typically, the downloaded application is launched on the user's mobile terminal.

Typically, the position of the mobile terminal is acquired through GPS by the launched application.

Typically, the launched application displays menu/voice menu in local language on the user's mobile terminal.

Typically, the user formulates a data query guided by a menu.

Typically, the user inputs captured images in this query.

Typically, the external/environmental parameters are sensed by external sensors and sent to the user's mobile terminal.

Typically, the collected data from the external sensors are sent to a data logger for future processing, which in turn captures the exact location of a system using a GPS modem.

Typically, the external sensors collect data from the external environment and the like.

Typically, the user's data query and the sensor data are arranged in a specific format by the pre processing unit along with personalized identification parameters.

Typically, the personalized identification parameters are the uses identification number, mobile number and the like.

Typically, the formulated query is transmitted to a remote server over a wireless network/internet.

Typically, the transmitted formulated query is received by the remote server which extracts relevant data from its database or Internet for the particulars about all the users.

Typically, the formulated query along with the relevant information extracted is sent to a human expert group/expert workstation for further analysis.

Typically, the expert group analyses the data received through a browser by connecting to the remote external server and formulates an advice which is sent back to the users mobile terminal or alternatively it is sent to the remote server which with a data tagging, arranging and processing means links data with the user's query and sends it back to the user.

Typically, the formulated advice is displayed in text/voice format at the mobile terminal /user end which the user uses for his advantage.

In accordance with one practical embodiment of this invention, the advisory system will send alerts to the farmer on his mobile terminal in case of occurrence of particular event such as sudden weather changes, fertilizer availability, publishing of a new government policy, new regulations which would impact the user of this system. Also, the farmer will be provided with forecast of the weather conditions for upcoming week.

In accordance with one practical embodiment of this invention, the farmer may request in his query for the current and future rates of transport means via different routes and the prices of the agricultural produce at the market places near the location of the farmer. Also, the farmer can request for information as to which factories have a demand for his agricultural produce. The server acquires this data from the Internet and sends it to the mobile terminal of the farmer.

In accordance with another practical embodiment of this invention, the farmer will receive relevant advertisements from different companies related to agricultural goods like seeds suppliers, fertilizer producers, tractor manufacturers, transporters and the like whose services are required by the farmers. These advertisements are transmitted to the mobile terminal of the farmer when he sends a query or receives an advice.

BRIEF DESCRIPTION OF ACCOMPANYING DRAWINGS

Figure 2:
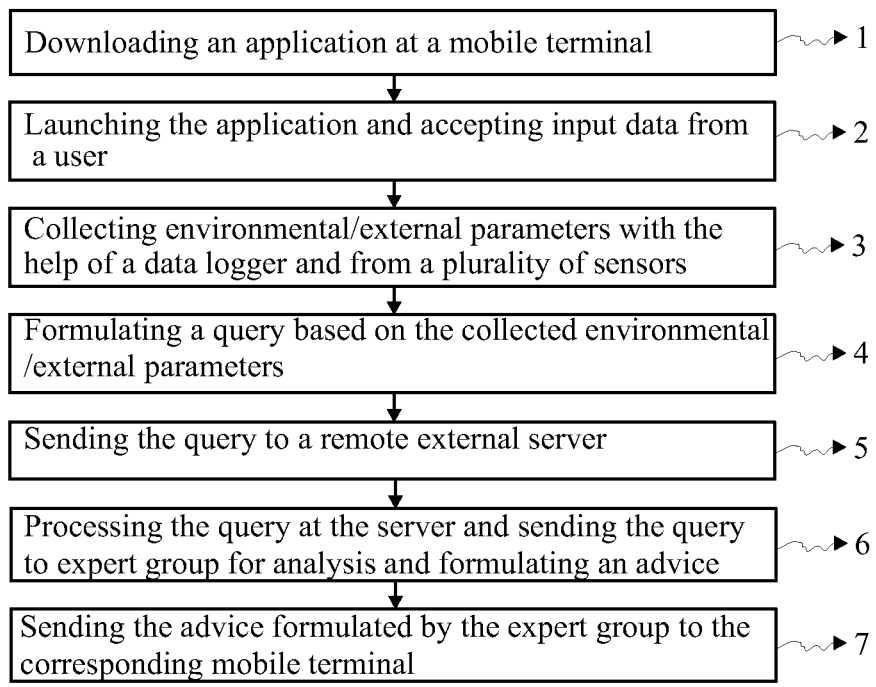

The invention will now be described with reference to the accompanying drawing, in which FIG. 1 is a block diagram of a mobile terminal based advisory system in accordance with this invention;

FIG. 2 is a flow diagram of operation of the mobile terminal based advisory system in accordance with this invention.

DETAILED DESCRIPTION OF ACCOMPANYING DRAWINGS

In farming, there is very less communication and information exchange between the farmer and the expert, the farmer and the government, the farmer and the market, the farmer and the other stakeholders such as fertilizer companies, pesticide companies, transporters, mills, traders. The present invention bridges the above mentioned gap. The gap is the result of the following reasons. Names of experts and their organization that would be able to provide information and advice are not available. If they are available, access is difficult and if access is possible, there are millions of farmers and few thousand experts. The farmer is also not able to ask the exact query and proper information regarding the problem to the expert such as soil nutrient status, crop appearance, local environment, dynamic parameters of the soil such as soil moisture, soil pH, soil salinity etc. There is no way for farmers in one region to know the problems of farmers in another region and the solutions which worked for them. Farmers also do not have any access to specific information they are looking for such as local weather, local prices of specific commodities, names of traders who would purchase their goods, location of warehouse and availability of space to store their produce, and the like. The farmers do not know best practices and the latest farming technology for a particular crop. They do not know the newly developed methods for land preparation, seed selection, seed processing, seed planting, choice, application and amount of fertilizers, choice, application and amount of pesticide to be used. Also they do not have knowledge of Crop growth management, harvesting of crop, handling weather uncertainties, Proper storage of harvested crop, etc which can increase the crop yield.

To address the above mentioned gaps and limitations, the present invention combines various technologies to bring out innovative platform/system. The system of this invention proposes the use of mobile terminals with cameras incorporated therein. Each mobile terminal is provide with GPS capability, software, middleware and programming capability. The system also includes sensors to capture various parameters such as weather, soil, insects, leaves, crops and plant data. The system typically uses a sensor network, data logger, CDMA modem with specific features, GPS modem, Solar panel for charging battery in the field, Battery, Digital rain gauge, WEB technology. The system further implements soil testing methods. System works in co-operation with a cellular network for voice and data combined with IVR technology, Text to speech technology, language translational technology, Speech recognition technology, and Voice SMS technology to implement the system. In accordance with one embodiment of the invention, the system includes a digital/electronic pen for inputting local language messages in a computer and Short Messaging service and the like may also be used for communication.

Above technologies, methods and devices are integrated to bridge the gap between farmer and the expert by providing personalized information in a manner which can be easily understood by a farmer. A system of this invention allows a farmer to frame a specific query to obtain advice on a mobile phone. By providing voice recognition techniques even an illiterate farmer is able to ask a query in voice format which is converted to a text format. Such a farmer is able to receive advice regarding his queries in text format which the system converts to voice format in order to enable the farmer to understand the advice. All the above said information is provided to a farmer in voice or text form in his local language. Typical advice includes personalized advice regarding information on crop specific, soil specific, location specific, local environment specific farming practices and farmer specific queries. A particular feature of tis invention is sys takes in account The advisory system also takes into consideration the date and time, season crop and fertilizer history. In real time In accordance with another aspect of this invention, the system includes a multimedia based training package implemented on a mobile phone for improving skills of the farmers. Typically, a portal is created for the farmers to get information on relevant government schemes and contact information. Also envisaged in accordance with this invention is a database of information such as pesticide & fertilizer shops in the vicinity, hospitals, and schools are also provided using the mobile system for advising. Transport facilities like tractor availability, railways and bus timing are also provided using a mobile phone so as to facilitate easy and quick transportation of the produce. The revenue for the entire advisory system is generated by means of advertisements targeted towards the farmers so that the farmers have to spend minimum amount for using the advisory system.

It is believed that this invention will develop Business intelligence for planning effective supply chain for farming operation which will lead to improved farming efficiency and better financial rewards for the farmers. Further the farmer and traders are connected and farmers can find a market for their produce easily and also get the best price for the same.

According to this invention there is provided a system which allows a user to get location and time specific personalized advice/information, in text or voice form, on their mobile terminal (mobile phone, laptop, pocket PC or any such specialized computer communication device) which is generated by a human expert or by an intelligent system on a machine.

The system typically uses a sensor network, data logger, CDMA modem with specific features, GPS modem, Solar panel for charging battery in the field, Battery, Digital rain gauge, WEB technology. The system further implements soil testing methods.

Referring to the drawings there is shown in FIG. 1 a block diagram of the mobile terminal based advisory system. A Mobile Terminal (MT) is a user device. The mobile terminal (MT) is programmed to download specific application script (AS), Indian language script rendering engine (LSRE), and text and voice menu. Input means (I) are provided at user end which include means for entering data into the mobile terminal (MT) in response to user interface screens and a voice menu with the provision for accepting input through speech. The system has a query formulation (QF) means for generating a query from the input means (I) at the user end. A language processing means (LPM) is provided for converting the text to voice and recognizing the voice commands. The mobile terminals (MT) have cameras incorporated with therein. Each mobile terminal is provided with GPS capability, software, middleware and programming capability. The system also includes sensors to capture various parameters such as weather, soil, insects, leaves, crops and plant data. System works in co-operation with a cellular network for voice and data combined with IVR technology, Text to speech technology, language translational technology, Speech recognition technology, and Voice SMS technology to implement the system. In accordance with one embodiment of the invention, the system includes a digital/electronic pen for inputting local language messages in a computer and Short Messaging service and the like may also be used for communication.

Sensors are provided at the user end for collecting information regarding weather (WS), soil (SS), crop and the like parameters automatically. The data logger (DL) is provided with a means for obtaining its location at any given time using GPS modem (GPSM). The mobile terminal is provided with a camera for capturing images of soil or crops. An application script means is provided for processing camera phone images, sensor data, and voice and text menu at user end. A preprocessing means (PP) is provided at user end for rearranging sensor data and query data before transmission. A personalization means (PM) for stamping the query and sensor data with time & date, location and other identification parameters is also provided.

The system has means at mobile terminal (MT) to transmit query and receive answers from the data carrying wireless network or Internet. Means are provided at server (S) end to transmit and receive data to and from wireless network or Internet.

Application script means are also provided at server (S) end for processing input query and routing the results to appropriate remotely located expert workstations.

The server has a database (DB) which stores a profile of all the farmers' along with the farm id, farmer id, soil data, past crop data, fertilizer data, pesticide data and the like. The server (S) receives the query along with the transmitted data and retrieves the relevant data from its database or Internet. This information is sent to a human expert group or an expert workstation for analysis (14).

The system is provided with an advice formulation (AF) means for providing relevant, personalized advice and information at server (S) end. The advice sent to the farmer will guide him in regards to different farming operations like ploughing, sowing, addition of fertilizers, spraying of pesticide, harvesting and the like. Contact details like telephone number or e-mail id of a human expert are provided along with the advice sent to the farmer.

The server (S) end of the system is provided with a data tagging, arranging and processing means (DPM) for linking data with the user's query.

Referring to the drawings there is shown in FIG. 2 the work flow of the mobile terminal based advisory system. The operation of the invention can be described as follows:

Region specific application required for the system to operate is downloaded by a farmer on his mobile terminal (1).

The farmer launches the downloaded application by pressing a key (2).

The application acquires the location of the mobile terminal using a GPS modem.

Menu in the local language of the farmer is displayed on the mobile terminal.

Along with this, the application in the mobile terminal plays the voice menu in the local language of the farmer.

The farmer responds to this menu by pressing appropriate keys or ICONS or by giving certain voice commands.

The weather parameters are obtained using sensors installed in the field.

Sensors placed in the field detect soil parameters like moisture content, salinity, Ph, fertility level and the like and send these to the mobile terminal or to a remote server.

The data from the sensors is periodically transmitted to a data logger. The data logger acquires the location of the system using a GPS modem (3).

The farmer can also capture some images and attach it to his query.

The pre processing unit arranges the image, sensor data, weather parameters, location parameters and the like in a specific format. A personalization means stamp the data with identification parameters like farmer id, farm id and mobile number (4). Personalization also includes providing personalized & local environmental data along with the farmer's query to the expert and generating advice specific to that person's query.

This data is transmitted as a query to a remote server via a wireless network or Internet (5).

The server receives the query along with the transmitted data and retrieves the relevant data from its database or Internet. This information is sent to a human expert group or an expert workstation for analysis (6).

The expert launches a browser and connects to the server. The human expert or an expert workstation read the queries sent to it and analyzes the query using the weather and soil parameters and images sent by the server.

The expert group or the expert workstation then formulates an advice.

This advice is then sent to the server or mobile terminal of the farmer directly via a wireless network or Internet (7).

The advice is sent to the mobile terminal in the local language of the farmer.

The mobile terminal displays this advice or converts it to a voice format in the local language of the farmer (18).

The mobile terminal advisory system sends alerts to the farmer on his mobile terminal in case of occurrence of certain events such as sudden weather changes, change in government policies, availability of fertilizer and pesticides, which impact farming operation and his daily life. Also, the farmer will be provided with forecast of the weather conditions for upcoming week.

The farmer may request in his query for the current rates of transport means via different routes and the prices of the agricultural produce at the market places near the location of the farmer. Also, the farmer can request for information as to which factories have a demand for his agricultural produce. The server (S) acquires this data from the Internet and sends it to the mobile terminal of the farmer. This helps the farmer to decide the best place to sell his produce to gain maximum benefit.

The farmer receives relevant advertisements from different companies on his mobile terminal related to agricultural goods like seed suppliers, fertilizer producers, tractor manufacturers, transporters and the like whose services are required by the farmers. Thus the advertisers pay the bulk of cost of required for this purpose while the farmers are required to pay only a nominal registration charges.

This system may be used to obtain information and advice regarding weather conditions and for obtaining information about the traffic conditions on the roads and market rates of different commodities. While all these applications of this invention are possible, the system of this invention is particularly used for providing personalized advice and information regarding agricultural activities.

Same system can be tuned to provide services to cattle industry.

This system provides a significant technological advance over the existing knowledge. This system provides soil, weather, crop related and other such information through the use of sensors such as soil, weather, and leaf and camera phone in response to a farmer's query. The time, location and crop & soil specific information and in addition to farmer's profile, help human experts or machine application running on a remote computer system to answer farmer's query effectively. This method is similar to a physical visit of an expert to the farm that would conduct test on the soil, visually inspect the crop and get to know the local weather and come up with a specific answer to a farmer's query. Additional advantage of this invention over physical visit is the availability of various tools such as best farming practices, pest model, and pictorial dictionary of plant diseases to the expert. Since the system is electronic, it can scale up easily and reach hundreds of millions of farmers which conventional system will not be able to do.

Along with the above mentioned technological advances, the system also provides economic significance over the existing knowledge. The mobile advisory system provides information and training relating to various agricultural processes. Thus, this results in the farmer producing a crop that is more in quantity and better in quality. The advisory system also helps in reducing the losses due to diseases.

In accordance with this invention the mobile based training and advisory system would thus help the farmers to a great extent. Thus, farmers need training to educate them which will lead to a better crop yield.

While considerable emphasis has been placed herein on the components and component parts of the preferred embodiments, it will be appreciated that many embodiments can be made and that many changes can be made in the preferred embodiments without departing from the principles of the invention. These and other changes in the preferred embodiment as well as other embodiments of the invention will be apparent to those skilled in the art from the disclosure herein, whereby it is to be distinctly understood that the foregoing descriptive matter is to be interpreted merely as illustrative of the invention and not as a limitation.

I claim:

1. A mobile based advisory method comprising the steps of:
   downloading a specific application script AS/local language script at a user end terminal rendering the user end mobile terminal in text and voice menu;
   launching the application at said mobile terminal and accepting input data from a user;
   collecting environmental/external parameters with the help of a data logger and from a plurality of sensors, wherein collecting the external/environmental parameters comprises sensing the external/environmental parameters by external sensors and sending the external/environmental parameters to the user end mobile terminal;
   formulating a query based on the collected environmental/external parameters;
   personalized identification parameters for stamping the query and sensor data with time/data/location and other identification parameters of the user; wherein the location of the user end mobile terminal is acquired through global positioning system (GPS) by the application;
   sending query to a remote external server;
   processing query at the remote external server;
   sending the query from the remote external server to a human expert group/expert workstation (HEG/EW) for analysis and formulating an advice based on the query;
   a language processing means for converting the formulated advice in text form to voice form and recognizing voice commands, in a selected local Indian language;
   receiving the advice formulated by the HEG/EW based on the queries to the user end mobile terminal; and
   displaying at the user end mobile terminal the formulated advice in text/voice form.

2. The mobile based advisory method as claimed in claim 1, wherein the application comprises a region specific application.

3. The mobile based advisory method as claimed in claim 1, further comprising guiding the user to formulate a data query guided by a menu.

4. The mobile based advisory method as claimed in claim 1, wherein accepting input data from the user comprises receiving captured images from the user.

5. The mobile based advisory method as claimed in claim 1, further comprising:
   sending the collected environmental/external parameters to the data logger, and
   using the data logger to capture the exact location of a system using a GPS modem.

6. The mobile based advisory method as claimed in claim 1, wherein collecting the environmental/external parameters comprises using the plurality of sensors to collect the external/environment parameters from the external environment.

7. The mobile based advisory method as claimed in claim 1, further comprising arranging the query, the sensor data, and personalized identification parameters in a specific format.

8. The mobile based advisory method as claimed in claim 7, wherein the personalized identification parameters are the uses identification number of the user and a mobile number of the user.

9. The mobile based advisory method as claimed in claim 1, wherein sending the query comprises transmitting the query to a remote external server over a wireless network.

10. The mobile based advisory method as claimed in claim 1, further comprising receiving the query by the remote external server, and using the remote external server to extract relevant data from its database or Internet for the particulars about all the users.

11. The mobile based advisory method as claimed in claim 10, further comprising sending the relevant data to the expert group for analysis.

12. The mobile based advisory method as claimed in claim 1, wherein the expert group:
   receiving the data received through a browser by connecting to the remote external server;
   analyzing the data;
   formulating the advice; and
   wherein sending the advice comprises sending the advice to the remote external server; and
   wherein the method further comprises, at the remote external server:
   linking the data with the query; and
   sending the data back to the user.

* * * * *